United States Patent Office
2,953,550
Patented Sept. 20, 1960

2,953,550

COPOLYMERS OF VINYL CHLORIDE AND ALKENYL ESTERS OF 3,4-EPOXYCYCLOHEXANE-1,1-DIMETHANOL

Frederick C. Frostick, Jr., and Benjamin Phillips, Charleston, W. Va., assignors to Union Carbide Corporation, a corporation of New York No Drawing. Filed Dec. 31, 1957, Ser. No. 706,308

4 Claims. (Cl. 260—86.3)

This invention relates to compositions comprising polymerized compounds. More particularly, this invention relates to compositions comprising, as characteristic components, unsaturated esters of epoxycyclohexylmethanols.

One of the primary objects of this invention is to provide a new series of resins that are cross-linkable at various stages of processing to yield three-dimensional structures possessing desirable physical properties. It is known that low molecular weight resins usually possess low tensile strengths while, at the same time, possessing desirable characteristics such, for example, as ease of handling and ease of fabrication, whereas the high molecular weight resins, and particularly the high molecular weight, three-dimensional structures, are strong but relatively infusible, insoluble, and difficult to fabricate. The present invention provides low molecular weight resins capable of cross-linking to produce high molecular, three-dimensional structures having in combination advantageous properties of both the low molecular weight resins and the high molecular weight resins.

Polymers that are infusible and insoluble have great commercial utility, for such products as shaped articles and coatings made therefrom have substantially complete resistance, to all ordinary solvents and they are not affected adversely by heat except at extreme temperatures at which charring occurs. Considerable difficulty is encountered, however, in manufacturing articles from infusible and insoluble resins.

In accordance with the present invention, compositions are provided that are low in molecular weight and thus are easy to fabricate and which can be later cross-linked into a high molecular weight, three-dimensional structure which is substantially infusible and insoluble. Such compositions are formed, according to the invention, by polymerizing a monomer containing dissimilar polymer-forming groups in the molecule with itself or with another polymerizable monomer.

Compounds containing the aforementioned dissimilar polymer-forming groups include the alkenyl esters of 3,4-epoxycyclohexane-1,1-dimethanols, characterized by the general formula:

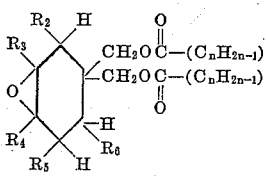

wherein $R_2$ through $R_6$ represent hydrogen or alkyl groups and the group $C_nH_{2n-1}$ represents an aliphatic hydrocarbon radical, free from acetylenic unsaturation, composed of carbon and hydrogen containing $n$ carbon atoms, $2n-1$ hydrogen atoms, wherein $n$ represents a whole positive integer in the range of from 2 through 8. More particularly, the group $C_nH_{2n-1}$ is intended to include unsaturated aliphatic hydrocarbon radicals, free from acetylenic unsaturation, containing from 2 through 8 carbon atoms, such as, for example, vinyl, allyl, crotyl, hexenyl, heptenyl, and the like.

As may be readily observed, the monomers employed in forming the compositions of the invention contain two dissimilar polymer-forming groups, namely, an epoxide group and an olefinic group. These two dissimilar groups form polymers by entirely different reaction mechanisms. The compounds can be subjected to conditions whereby polymerization occurs through one group to the exclusion of polymerization through the second group. The resulting polymer can then be further polymerized under different conditions through the unaffected second group so that an infusible and insoluble polymer is formed. The dissimilarity of polymer-forming groups permits control over polymer formation with the production of polymers having a versatility of properties heretofore unobtainable.

The compositions of this invention, while fulfilling the requirements of many other desirable uses, are particularly adapted for use as protective coatings suitable for industrial applications as paints, paper, leather, for coating, impregnating or sizing cloth, laminates and linings for the inside of cans and containers.

The polymer compositions of this invention are directed to compositions comprising, as characteristic components, the alkenyl esters of 3,4-epoxycyclohexane-1,1-dimethanols. More particularly, the polymer compositions are directed to compositions comprising the product of polymerization of a mixture containing the aforementioned alkenyl esters of 3,4-epoxycyclohexane-1,1-dimethanols and one or more additional polymerizable, unsaturated monomers.

Among the additional polymerizable monomers suitable for polymerization with the aforementioned epoxy-vinyl monomers are included the vinyl esters of inorganic acids, such as, vinyl chloride, acrylonitrile and methacrylonitrile; the vinyl esters of aliphatic monocarboxylic acids, such as, vinyl acetate, vinyl butyrate, vinyl chloracetate, vinyl formate and vinyl caproate; the vinylidene halides, such as, vinylidene chloride, vinylidene bromide and vinylidene fluoride; the alkyl esters of olefinically unsaturated aliphatic monocarboxylic acids, such as, methyl acrylate, methyl methacrylate and ethyl acrylate; the olefinically unsaturated moncarboxylic acids, such as, acrylic acid and the alpha-alkyl substituted acrylic acids and the like.

The proportions of reactive monomers suitable for use in preparing the novel copolymers of this invention will vary over a wide range depending on the particular reactants and the type of product desired. It is possible to make a complete range of polymers from substantially rigid to very flexible by proper selection of the ratio of reacting monomers. These polymers find utility for applications, such as, floor coverings, wire coatings, plastic pipe, upholstery, raincoats, surface coatings of all types and films for the packaging of food.

The polymerization of the epoxy monomers herein disclosed is readily accomplished by any suitable means. The polymerization reaction is preferably accomplished by heating one or more epoxy-containing monomers with one or more polymerizable ethylenically unsaturated monomers in the presence of a polymerization catalyst. The polymerization reaction can be carried out in solution, emulsion, suspension or bulk systems. If solvents are employed, they can be solvents for the monomers and polymer, or they may be solvents for the monomers and non-solvents for the polymers. Examples of solvents useful in a solution polymerization technique are acetone, tetrahydrofuran, dimethylformamide, benzene and the like.

In a typical solvent polymerization, a solvent such as acetone is charged to an autoclave and then the epoxy-containing monomer and polymerization catalyst are added. The autoclave is then flushed out with nitrogen or other inert gas and sealed. When vinyl chloride is selected as the coreacting monomer, it is then passed into the autoclave. The reaction mixture is then brought up to temperature and the temperature is maintained until polymerization is substantially complete. Substantially complete polymerization of the reactive monomers can ordinarily be achieved in a period of time varying from about 16 to about 40 hours.

Generally, the solids content of the autoclave varnish containing the copolymerized resins may run as high as 40 percent solids. This provides an economic advantage in that less solvent is required to maintain a satisfactory viscosity.

If it is desired to carry out the polymerization reaction in an emulsion system, water, an emulsifier and a water-soluble persulfate catalyst are charged to an autoclave. The reactive monomers are then charged to the autoclave. In the case of a vinyl chloride polymerization, the epoxy monomer is charged first, the system is then flushed out with an inert gas and then the vinyl chloride is added. Thereafter, the reaction mixture is brought to a temperature and the temperature is maintained until polymerization is substantially complete. In a similar manner, the polymerization of the reactive monomers can be carried out in a suspension polymerization system.

The catalyst used in effecting the polymerization reaction can be either inorganic or organic in nature and may be exemplified by acetyl peroxide, benzoyl peroxide, benzoyl acetyl peroxide, tertiary-butyl hydroperoxide, tertiary-butyl perbenzoate, cumene hydroperoxide, tertiary-butyl peracetate, potassium persulfate, azo bisisobutyronitrile and the like. The amount of catalyst required is not narrowly critical and can vary over a wide range. In general, the catalyst concentration will vary from 0.1 percent to 5.0 percent by weight of the material being polymerized.

The temperature employed in the polymerization likewise is not narrowly critical and can vary over a considerable range depending upon the monomer and the catalyst being employed. In most cases, the temperature will vary from 0° C. to about 150° C. Preferred temperatures range from 40° C. to 60° C. Atmospheric, superatmospheric or subatmospheric pressures may be utilized. In practice, the polymerization is effected through the olefinic groups and later curing of the resin to a three-dimensional structure can be effected through the epoxide groups with the aid of heat or various cross-linking catalysts.

Unreacted materials are separated from the polymer by known methods, such as solvent extraction, precipitation, distillation, filtration and the like. The polymer resin can then be worked up in any suitable manner.

Other materials such as coloring agents, pigments and the like may be incorporated into the resins, if desired.

The following examples will serve to illustrate the practice of the invention:

EXAMPLE 1

*Preparation of 3,4-epoxycyclohexane-1,1-dimethanol dicrotonate*

A solution of 0.42 mol of peracetic acid in ethyl acetate was added dropwise to 107 grams of 3-cyclohexene-1,1-dimethanol dicrotonate over a period of 25 minutes, while the temperature was maintained in the range of from 45° C. to 50° C. The reaction mixture was stirred for a period of 2 hours, whereupon a sample was taken and titrated for peracetic acid. The titration indicated that the reaction was 95.5 percent complete.

The reaction mixture was then fed into ethylbenzene, refluxing under 25 mm. Hg pressure absolute. Acetic acid and other low-boiling components were removed. The ethylbenzene was stripped off and there was obtained a residue product which, when flash distilled batchwise on a gooseneck type still, provided 99 grams of a clear, viscous liquid having a boiling point in the range of from 175° C. to 200° C. at 2 mm. Hg pressure absolute. The purity of the compound by titration for epoxide with the pyridine hydrochloride method was 91.0 percent and the oxirane oxygen content of the product was 4.97 percent.

EXAMPLE 2

*Copolymerization of 3,4-epoxycyclohexane-1,1-dimethanol dicrotonate and vinyl chloride*

Recipes were prepared comprising vinyl chloride, 3,4-epoxycyclohexane-1,1-dimethanol dicrotonate (from Example 1) and diacetyl peroxide as a polymerization catalyst. The epoxide and catalyst were charged to glass tube receptacles and cooled with Dry Ice. The receptacles were flushed with nitrogen, corked and vinyl chloride, as a liquid, was added. The glass tube receptacles were then sealed and weighed to determine the weight of vinyl chloride added. The glass tubes were set in a water rocker bath maintained at a temperature of 50° C. Polymerization was initiated and allowed to proceed as indicated below. After the runs were complete the glass tubes were broken and the contents thereof collected and washed four times with isopropanol to remove traces of reactants. The washed product was then dried in a circulating air oven maintained at a temperature of 50° C. overnight. A summary of the runs and properties of the resins obtained appear below:

| Run No. | Vinyl Chloride, amt., gms. | Epoxide, amt., gms. | Time, min. | Yield, gms. | Copolymerized Vinyl Chloride, Percent | Reduced Viscosity in Cyclohexanone |
|---|---|---|---|---|---|---|
| 1 | 9 | 1 | 70 | 0.1 | 97.8 | --- |
| 2 | 6 | 4 | 437 | 0.8 | 65.2 | 0.54 |
| 3 | 9 | 1 | 97 | 0.3 | 91.2 | 1.06 |
| 4 | 8 | 2 | 173 | --- | 79.0 | --- |
| 5 | 8 | 2 | 195 | 0.7 | 74.0 | 0.49 |
| 6 | 6 | 4 | 395 | 1.2 | 50.3 | 0.51 |

What is claimed is:

1. A copolymer of 3,4-epoxycyclohexane-1,1-dimethyl dicrotonate and vinyl chloride.

2. Copolymers of dialkenyl diesters of 3,4-epoxycyclohexane-1,1-dimethanol containing from 2 through 8 carbon atom in each alkenyl group and vinyl chloride.

3. A copolymer of 3,4-epoxycyclohexane-1,1-dimethyl dicrotonate and vinyl chloride containing from 50.3 to 97.8 percent copolymerized vinyl chloride.

4. Copolymers of alkenyl esters of 3,4-epoxycyclohexane-1,1-dimethanols which are characterized by the general formula:

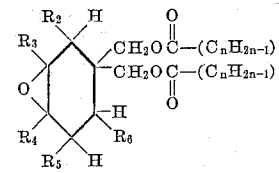

wherein $R_2$ through $R_6$ represent members selected from the group consisting of hydrogen and alkyl groups and the group $C_nH_{2n-1}$ represents an aliphatic hydrocarbon radical, free from acetylenic unsaturation, composed of carbon and hydrogen containing $n$ carbon atoms, $2n-1$ hydrogen atoms, wherein $n$ represents a whole positive integer in the range of from 2 through 8; and vinyl chloride.

References Cited in the file of this patent

UNITED STATES PATENTS 2,883,398    Frostick et al. _____ Apr. 21, 1959